United States Patent
Murynets et al.

(10) Patent No.: US 9,445,245 B2
(45) Date of Patent: Sep. 13, 2016

(54) SHORT MESSAGE SERVICE SPAM DATA ANALYSIS AND DETECTION

(75) Inventors: Ilona Murynets, Rutherford, NJ (US); Roger Piqueras Jover, New York, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 210 days.

(21) Appl. No.: 13/539,675

(22) Filed: Jul. 2, 2012

(65) Prior Publication Data
US 2014/0004892 A1 Jan. 2, 2014

(51) Int. Cl.
*H04W 4/00* (2009.01)
*H04W 4/14* (2009.01)
*H04L 12/58* (2006.01)
*H04M 3/42* (2006.01)

(52) U.S. Cl.
CPC ............. *H04W 4/14* (2013.01); *H04L 51/12* (2013.01); *H04M 3/42382* (2013.01)

(58) Field of Classification Search
CPC ............. H04W 4/12; H04W 3/42382; H04M 1/2478; H04M 7/0048; H04M 15/844
See application file for complete search history.

(56) References Cited

U.S. PATENT DOCUMENTS

| 2003/0083078 A1* | 5/2003 | Allison et al. ................. 455/466 |
| 2004/0082346 A1* | 4/2004 | Skytt ..................... H04W 24/02 455/456.3 |
| 2005/0101306 A1 | 5/2005 | Zabawskyj et al. |
| 2005/0186974 A1* | 8/2005 | Cai ................................ 455/466 |
| 2006/0211406 A1* | 9/2006 | Szucs et al. ................... 455/410 |
| 2007/0233861 A1 | 10/2007 | Cai et al. |
| 2009/0204481 A1* | 8/2009 | Navar ..................... G06Q 30/02 725/14 |
| 2012/0003983 A1* | 1/2012 | Sherlock ................. H04L 41/08 455/450 |
| 2012/0059785 A1* | 3/2012 | Pascual Leo et al. .......... 706/50 |
| 2012/0109781 A1* | 5/2012 | Felt et al. .................. 705/26.41 |
| 2012/0266209 A1* | 10/2012 | Gooding ................. H04L 63/20 726/1 |
| 2013/0007151 A1* | 1/2013 | Chen et al. .................... 709/206 |

OTHER PUBLICATIONS

Polystar OSIX, Symsoft. "Detect and Block Malicious SMS," consists of 4 unnumbered pages.
S. Dixit, S. Gupta, C. V. Ravishnakar. "LOHIT: An Online Detection & Control System for Cellular SMS Spam," *Proc. of the IASTED International Conference Communication, Network, and Information Security*, Nov. 2005, pp. 48-54, Phoenix, AZ.
Q. Xu, E. W. Xiang, Q. Yang, J. D. Zhnog, J. Zhnog. "SMS Spam Detection Using Non-Content Features," to appear in *IEEE Intelligent Systems*, Jan. 2012, consists of 8 unnumbered pages.
M. Z. Rafique, M. Farooq. "SMS Spam Detection by Operating on Byte-Level Distributions Using Hidden Markov Models (HMMS)," *Virus Bulletin Conference*, Sep. 2010, pp. 1-7.

\* cited by examiner

*Primary Examiner* — Keith Fang

(57) ABSTRACT

A method and apparatus for identifying a potential source of SMS spam are disclosed. For example, the method collects a plurality of call detail records, extracts at least one feature from each of the plurality of call detail records, and identifies the potential source of the short message service spam by analyzing the at least one feature that is extracted from each of the plurality of call detail records.

20 Claims, 5 Drawing Sheets

SHORT MESSAGE SERVICE SPAM DATA ANALYSIS AND DETECTION

The present disclosure relates generally to communication networks and, more particularly, to a method and apparatus for analyzing network data for detecting short message service (SMS) spam, SMS spammers and/or SMS spam related activity.

BACKGROUND

Spam is a well known and studied problem in the context of email. Accurate solutions detect and block millions of emails daily. This results in a minimal amount of spam reaching customer's inboxes, despite studies estimating that 90% of the daily electronic mail traversing the internet is spam. Short message service (SMS) spam, despite having been an issue for years, is currently one of the main problems that cellular networks face. Millions of illegitimate text messages are transmitted on cellular networks daily, taking over resources that could otherwise be allocated to customers for legitimate purposes, such as for enhancing service experience. Large loads of SMS messages are also known to cause saturation problems at wireless links between Global System for Mobile Communications (GSM) and third-generation (3G) networks. In parallel, SMS spam results in unwanted bill charges for some users and leads to customer dissatisfaction. Further, mobile SMS spam is only forecasted to increase at a great rate. Unfortunately, current SMS detection solutions have been unable to effectively dissuade or curtail spammers from their messaging campaigns.

SUMMARY

In one embodiment, the present disclosure describes a method and an apparatus for identifying a potential source of SMS spam. For example, the method collects a plurality of call detail records, extracts at least one feature from each of the plurality of call detail records, and identifies the potential source of the short message service spam by analyzing the at least one feature that is extracted from each of the plurality of call detail records.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
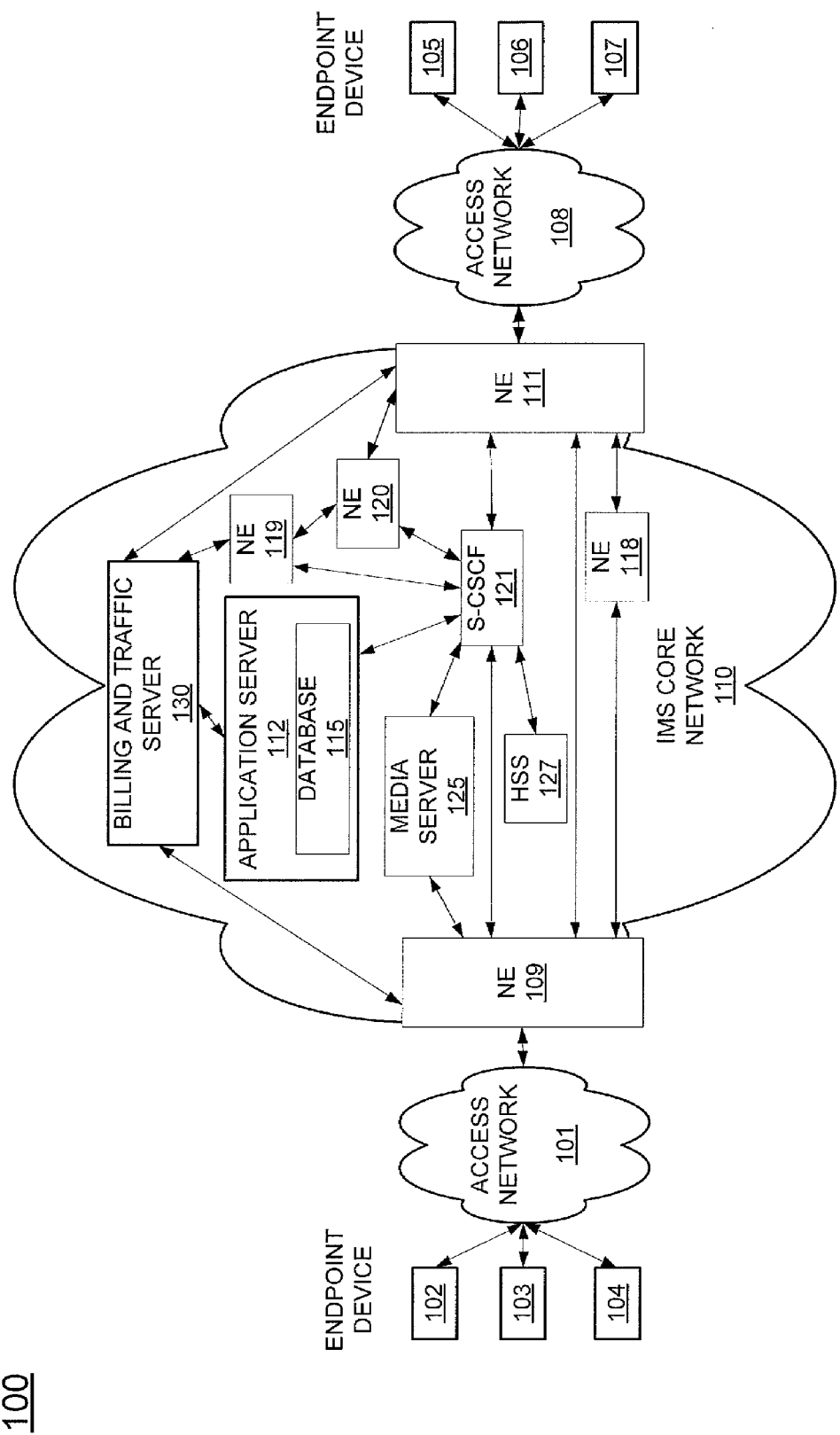
FIG. 1 illustrates an exemplary network related to the present disclosure.

The present disclosure broadly describes a method and apparatus for identifying a potential short message service (SMS) spam source, e.g., a software tool that is deployed on an application server. Although the present disclosure is discussed below in the context of exemplary wireless/cellular networks and an Internet Protocol (IP) core network, e.g., an Internet Protocol (IP) Multimedia Subsystem (IMS) network, the present disclosure is not so limited. Namely, the present disclosure can be applied to communication networks in general, e.g., Service over Internet Protocol (SoIP) networks, asynchronous transfer mode (ATM) networks, wireless networks, cellular networks and the like.

Short message service (SMS) spam is currently a problem for cellular networks, and telecommunications networks operators. There are several possible approaches to address SMS spam. In one approach, messages are screened one by one (generally based on an analysis of the message content) to determine whether they are legitimate or not. Illegitimate messages are blocked independently from the source. Accounts engaged in spamming are cancelled after a threshold number of complaints are received. These techniques require tremendous computational cost, and access to the content of every single SMS message, which raises privacy issues and may not be fully effective. Spammers are adept at formulating evasions strategies to circumvent such algorithms.

Another approach is based on manual analysis of telephone numbers that are reported as spammers, e.g., to 7726. This is a relatively new service that allows legitimate customers to report spam messages that they receive. The suspicious accounts are manually analyzed by network personnel and appropriate actions are taken, e.g., account cancellation. However, there is a delay between spamming campaigns, the reporting of a SMS message as spam and account cancellation. Thus, before an account is cancelled, potentially thousands of messages may be sent. In addition, the easy availability of pre-paid accounts makes this solution inefficient to completely stop illegitimate spamming activities.

In contrast, embodiments of the present disclosure introduce an architecture and method based upon call detail record (CDR) data analysis for SMS spam detection. Embodiments of the present disclosure achieve high detection accuracy and in less time that prior approaches. In addition, while in the past SMS spammers could continue to elude network operators by simply obtaining a new subscriber identity module (SIM) and continuing to use the same hardware device(s), the present embodiments will force spammers to obtain new phones, cellular modems and/or other equipment on a regular basis. Thus, the cost to a spammer to continue evading network operators greatly increases.

In one embodiment, mobile originating and/or mobile terminating call detail records (CDRs) (e.g., obtained from the originating and terminating access networks) are analyzed for the purpose of identifying potential SMS spam sources. CDR records contain multiple fields, including a time stamp for the start of a call, a call duration, the sender and caller phone numbers, the disposition of the call, the call type, and other call related information. In one embodiment, CDRs from voice, SMS as well as Internet Protocol (IP) traffic are queried. At least any one or more of the following fields/features are analyzed: sender number, receiver number, account type (pre-paid, contract, etc.), age of the contract, mobile equipment identifier (MEID) and/or international mobile equipment identity (IMEI) (e.g., to compare to a "blacklist" or "device watch list"), a type allocation code (TAC) which identifies a particular manufacturer and model type of the sending device, coordinates of the base station that handled the message in the uplink and the downlink, LACCI (Location Area Code/Cell ID) indicative of the geographic location of the origin and/or destination(s) of a message/call, geographic coordinates, which are also indicative of the geographic location of the origin and/or destination(s), time stamp, message length, duration of voice calls, and amount of data per IP session (uplink and downlink). In addition, multiple CDRs from different calls may be analyzed collectively to detect patterns indicative of SMS spam activity. For instance, in one embodiment, the interval between consecutive messages is derived by comparing the time stamps of at least two different call detail records. In addition, in one embodiment the total number of outgoing and incoming SMS messages and voice calls per hour, per day, etc., are derived from a plurality of CDRs. Still other CDR features that may be used comprise: a response ratio (the number of responses to messages compared to the number of outgoing messages), the voice call load (versus the volume of SMS messages, or SMS load), the number of different SMS message destinations, the distribution of contacted area codes, and others. More generally, one or more features are derived from one or more CDR fields that are used to obtain a feature set. The feature set is then analyzed and parsed to obtain a profile for SMS spam traffic in the network and to identify potential SMS spam sources.

In one embodiment, a classification model/algorithm, which may comprise a decision tree-based method, is used for identifying potential SMS spam sources based upon the collected CDR data. It should be noted that, certain CDR features are more or less expensive (or time consuming) to collect, and are therefore easier or more difficult to implement. For example, for several of the CDR features (device watch list, manufacturer/model, location and contract age) only a single call detail record is needed. On the other hand, the entropy of the time between two consecutive messages requires parsing records for several hundred messages. This often requires just a few minutes given the message rate of spammers of thousands of messages per day. It is therefore also a "cheap" feature. Thus, embodiments of the present disclosure can potentially detect a spammer based upon as little as one text message (seconds) or up to several hours or days worth of messages. Embodiments of the present disclosure are described in greater detail below in connection with the following FIGS. 1-5.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile/cellular phones, smart phones, tablets, PBXs, aggregate endpoints (e.g., an aggregate endpoint that employs a SIP user agent to interact with the network on behalf of a plurality of endpoints aggregated behind it) and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a cellular or wireless access network, a $3^{rd}$ party network, Wi-Fi network and the like. In one particular embodiment, at least one of access networks 101 and 108 comprises a cellular/wireless access network. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services, cellular services and the like). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers, in the case of a VoIP/voice call, other application servers in the case of calls/messages terminating and/or originating in cellular access networks). For example, the S-CSCF may need to interact with another server for translation of an E.164 voice network address into an SIP URI, and so on. For example, the S-CSCF routes to a P-CSCF indicated by the SIP URI. The P-CSCF then routes to the SIP User Agent (UA) over a relationship that is established between the P-CSCF and the SIP UA which may represent an aggregate endpoint. This relationship could be a SIP trunk.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The billing and traffic server 130 (broadly a billing server) is a dedicated server that tracks communication traffic for the purpose of generating bills to the customers of the service provider. For example, the billing and traffic server 130 is capable of tracking a large number of call parameters, or features, such as and not limited to: the number of calls, the duration of calls, the calling party numbers, the called party numbers, the types of call, and so on. In the context of the present disclosure a "call" is broadly considered to be any voice or data call (e.g., including short message service (SMS) messages) traversing the network, and includes calls originating and/or terminating in cellular access networks. These call features are processed and accounted by the billing and traffic server 130 so that proper bills are generated and provided to the customers of the service provider.

In one embodiment, the network elements that are involved in supporting a call will provide call handling information to the billing and traffic server 130. For example, the border elements (e.g., 109, and 111) that support a media path between a calling party (e.g., endpoint device 102) and a called party (e.g., endpoint device 105) will provide one or more call detail records (CDRs) to the billing and traffic server 130 upon termination of the call. Broadly, a CDR is a record produced by a network element containing details of a call that passed through it. CDR records and cause codes conform to an industry standard format. In addition, any and all network elements, including devices/network elements in the access network may generate CDRs in association with a particular call. In the context of the present disclosure, the billing and traffic server 130 may collect CDRs from any and all such network elements, or selected network elements involved in processing one or more calls traversing the network 100.

The application server (AS) 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present disclosure.

The above IP network is only described to provide an illustrative environment in which packets for voice, data, and multimedia services are transmitted on IP Multimedia Subsystem (IMS) networks. In one embodiment, the IMS service provider may wish to implement a method that will manage the network in a manner that will allow the service provider to quickly identify a potential source of SMS spam. More specifically, the method is able to identify, using one or more collected call detail records (CDRs) a potential SMS spam source that is generating one or more SMS spam messages. In other words, the identification of a potential SMS spam source may be based upon one or more call detail records obtained from any segment of a call flow including one of the access networks, 101 or 108, or even from CDRs generated by a customer-premises equipment situated at a customer site.

In one embodiment, a method for identifying a potential source of SMS spam, e.g., a software tool, is implemented in an application server, such as AS 112. In brief, the method for identifying a potential SMS spam source method continuously gathers data (e.g., CDRs) and parses the gathered data so as to quickly identify potential SMS spam source(s) and presents the potential SMS spam source(s) to appropriate personnel and other devices/systems for further action.

In one embodiment, the method for identifying a potential SMS spam source is deployed in application server 112 and continuously obtains CDRs that are provided to the billing and traffic server 130. More specifically, the application server 112 does not interrupt the operation of the billing and traffic server 130, but simply copies the CDRs that are provided to the billing and traffic server 130 (e.g., in real time, or near real time, or in accordance with a predefined schedule) via a separate or adjunct link. Using the CDRs, the method for identifying a potential source of SMS spam is able to quickly obtain and evaluate information/data to identify potential SMS spammers, or more precisely, the potential SMS spammer's device(s). These various functions will be further described below. In this regard, it should be noted that the present disclosure is not limited as to the manner in which the CDRs are collected or delivered to a device executing the method for identifying a potential source of SMS spam. Namely, any manner in which the CDRs are collected and/or delivered are within the scope of the present disclosure.

Figure 2:
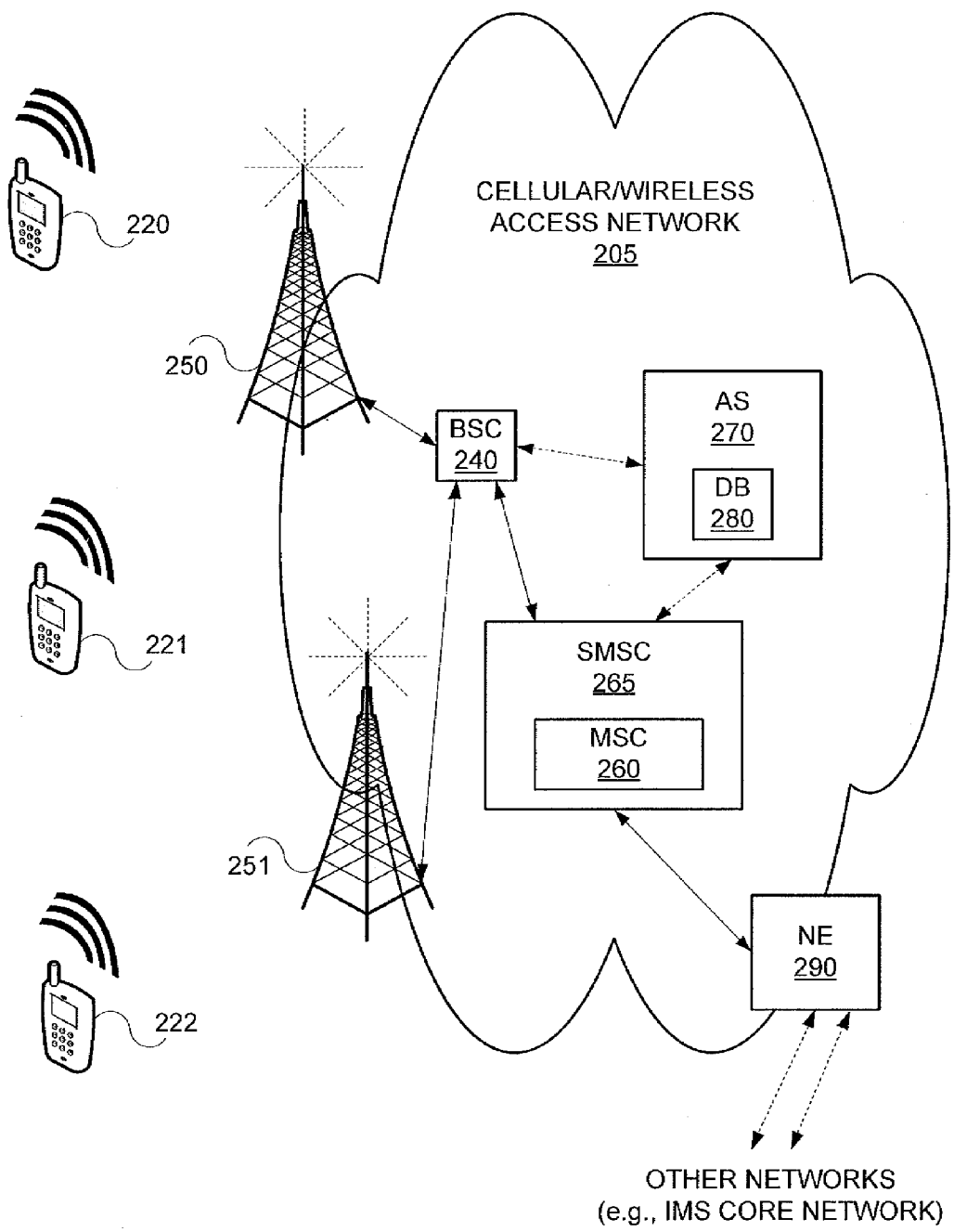
FIG. 2 illustrates an exemplary wireless access network related to the present disclosure.

FIG. 2 illustrates an exemplary access network 200 suitable for implementing embodiments of the present invention for identifying a potential SMS spam source. In one embodiment, the access network 200 comprises a wireless access network 205 (e.g., a cellular access network). Access networks 101 and 108 depicted in FIG. 1 may comprise, for example, a wireless access network 205 as shown in FIG. 2. Wireless access network 205 is configured to support wireless communication of users via respective wireless endpoint devices 220-222, with other wireless or wireline users. The link between wireless endpoint devices 220-222 and the wireless access network 205 comprises radio frequency (RF) signals between the one or more base stations 250-251 and the wireless endpoint devices 220-222. Here only two base stations 250 and 251 are depicted. However, it should be appreciated that the wireless access network 205 may comprise any number of base stations depending upon the size and needs of the wireless access network. In addition, although only three wireless endpoint devices 220-222 are depicted, it should be appreciated that any number of wireless endpoint devices may be serviced at the same time by the wireless access network 205.

Each of the base stations 250-251 comprises, at a minimum, a RE transceiver, and is configured to receive and transmit RF signals to and from wireless endpoint devices (e.g., wireless endpoint devices 220-222). As illustrated in FIG. 2, base stations 250-251 may support calls for a plurality of wireless endpoint devices 220-222 in a particular cell or cell sector of the base station. To manage the communications of the multiple wireless endpoint devices serviced by the wireless access network 205, the wireless access network 205 may comprise one or more network elements. For example, the wireless access network 205 may comprise one or more base station controllers (BSCs) and/or Radio Network Controllers (RNCs) for managing RF communication of the base stations 250-251. Although only one BSC/RNC 240 is depicted in FIG. 2 it should be understood that any number of BCSs/RNCs can be deployed. For example, each base station 250-251 could be serviced by its own BSC/RNC, or multiple base stations can be served by a single BSC/RNC. BSC/RNC 240 performs a variety of wireless network management related tasks such as wireless channel assignments, determining transmission power levels, and controlling handovers from one base station to another base station, and the like. It should be noted that some of the functionalities of BSC/RNC could be implemented in the base stations 250-251. Similarly, some of the functionalities of BSC/RNC could be implemented in the MSC 260.

In one embodiment, wireless access network 205 includes at least one mobile switching center (MSC) 260. Among other functions, the MSC 260 may receive from a home location register (HLR) or home subscriber server (HSS), which may reside outside the cellular/wireless access network 205, information that is needed to support mobile service subscribers, such as user registration and authentication information. Thus, the MSC 260 may support communication services for users currently serviced by the base stations within the portion of the wireless access network that is the responsibility of MSC 260 according to the respective user profiles. The MSC may also function as a media gateway and/or media gateway controller facilitating communication between the wireless access network 205 and other networks. For example, in a typical circuit-switched wireless communication system, the MSC may connect the landline circuit switched network (e.g., a public switched telephone network (PSTN) system), or an IMS network, to the wireless communication system. Thus, the MSC 260 may be responsible for connecting calls from wireless endpoint devices 220-222 to other wireless endpoint devices on the same access network or on other networks such as a Session Initiation Protocol (SIP) based Internet Protocol multimedia subsystem (IMS) core network, a landline circuit switched network (e.g., a public switched telephone network (PSTN)), VoIP networks, asynchronous transfer mode (ATM) or frame relay networks, etc., via a network element 290.

In one embodiment, the wireless access network 205 includes a short message service center (SMSC) 265. The SMSC is responsible for receiving SMS messages from and forwarding SMS messages to the wireless/mobile endpoint devices 220-222. The SMSC 265 transmits SMS messages to other networks, when a SMS message originates from one of the wireless endpoint devices 220-222, and forwards SMS messages to the wireless endpoint device 220-222, when a SMS message is sent from elsewhere to one of the wireless endpoint devices 220-222. If one of the wireless endpoint devices 220-222 is unavailable to receive a message, the SMSC 265 will store the SMS message until the particular wireless endpoint device becomes available. Although the MSC 260 may perform numerous functions that are unrelated to SMS messages, in one embodiment the MSC 260 is a component of the SMSC 265. Thus, as illustrated in FIG. 2, MSC 260 forms a part of SMS 265. However, it should be understood that the present disclosure is not so limited. Namely, in other embodiments, the MSC 260 and SMSC 265 may be separate components. In addition, the SMSC 265 may provide various reports to the sender and or recipient with respect to the submission, status and delivery of a SMS message. In this regard, it should be noted that aspects of such reports may be reflected in fields in one or more call detail records (CDRs) generated by the SMSC 265, and other components, in connection with a particular message or call. In one embodiment, the SMSC 265 is configured to forward SMS messages in a manner that is compatible with other networks. For example, the SMSC 265 may be a Session Initiation Protocol (SIP) capable device and may therefore encapsulate a SMS message in a SIP protocol message in order to convey the SMS message through an IP network (e.g., an IMS core network) for onward transmission to a recipient device. For instance, the SMSC 265 may forward a SIP encapsulated SMS message externally from the cellular/wireless access network 205 via network element 290. Notably, in one embodiment a SMS spam source may reside in a non-cellular network and originate SMS spam directed towards one or more recipient cellular/mobile devices.

In one embodiment, the wireless access network 205 may also include an application server 270. The application server 270 may include a database 280 suitable for collecting and storing call detail records (CDRs) (e.g., with respect to CDRs generated by network elements of the wireless access network 205, such as SMSC 265). In one embodiment, the application server 270 may also forward collected and stored CDRs outside the wireless access network 205. In particular, the application server 270 may send the collected CDRs to a billing and traffic server in an IMS core network (e.g., billing and traffic server 130 in FIG. 1) for further processing in accordance with the exemplary method for identifying a potential SMS spam source, and other embodiments described herein. The application server 270 may be configured to provide one or more functions supporting calls via the wireless access network 205. For example, application server 270 may comprise any server or computer that is well known in the art, and the database 280 may be any type of electronic collection of data that is also well known in the art. In other embodiments, call detail records (CDRs) may be stored in base station 250, BSC/RNC 240 or MSC 260, or a combination thereof.

Although the network elements deployed within the wireless access network 205 have been described as one or more discrete devices, it should be appreciated that the functionality described with respect to each network element is not limited to the particular device as described and depicted herein. Rather, the embodiment of FIG. 2 is merely illustrative of one wireless access network configuration that is suitable for implementing embodiments of the present invention. Thus, any other network elements providing the same functionality described herein with respect to the wireless access network 205 would be equally suitable for use in accordance with embodiments of the present invention. Those skilled in the art will realize that the wireless access network 205 may be expanded by including additional endpoint devices, base stations, BSCs, MSCs, SGSNs, GGSNs, network elements, application servers, etc. without altering the scope of the present disclosure. In addition, it should be noted that although certain components have been depicted and described in connection with wireless access network 205, in some embodiments, such components may be interconnected in a different manner or may even reside in different networks. For example, SMSC 265 may be located in an IMS core network (e.g., IP core network 110 in FIG. 1) rather than in an access network, or, may even be hosted by a third-party (e.g., not in the wireless access network 205 and not in a core communication network).

Figure 3:
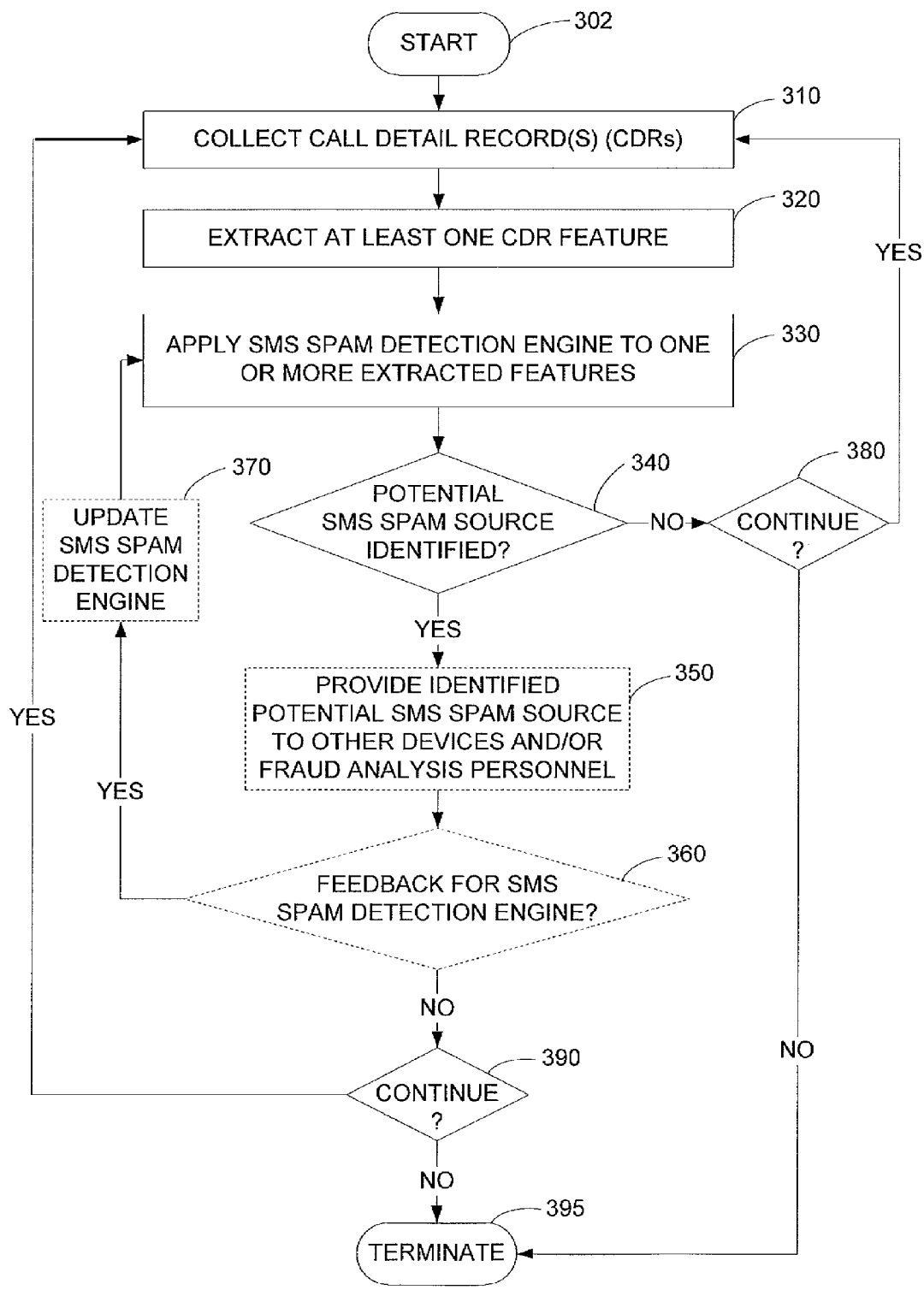
FIG. 3 illustrates a flowchart of a method for identifying a potential SMS spam source according to the present disclosure.

FIG. 3 illustrates a flowchart of a method 300 for identifying a potential SMS spam source. In one embodiment, the method 300 can be performed by the application server 112 for processing CDRs. However, in other, further and different embodiments, the method 300 may be performed by one or more other devices, such as any one or more of the devices shown in network 100 of FIG. 1 or access network 200 of FIG. 2. Method 300 starts in step 302 and proceeds to step 310.

In step 310, method 300 collects CDRs (e.g., continuously and/or periodically) from a plurality of network elements (e.g., 109, 111, 118-121, 125 and 130 within the core IP network 110, SMSC 265 in cellular/wireless access network 205 in FIG. 2, etc.). In one embodiment, the collection occurs in near real time (accounting for normal delays associated with network conditions and/or transmission constraints), i.e., as the network elements are generating the CDRs for billing purposes. In other words, the CDRs are received as network elements are forwarding their CDRs to the billing and traffic server 130 for accounting purposes. In one embodiment, the method 300 copies the CDRs without interrupting the functions of the billing and traffic server 130 via an adjunct link. One advantage of this approach is the absence of having to reconfigure the functions performed by the various network elements. Namely, these network elements have already been pre-configured to forward their CDRs for billing purposes. The present method exploits this existing function to provide additional network management functionalities. Thus, the present method can readily be scaled up or down as the number of network elements are increased or decreased.

In one embodiment, the present method may receive CDRs from processing elements that are external to the core IP network. For example, border elements or other devices that are deployed within the access networks 101 and 108 of FIG. 1 or wireless access network 205 of FIG. 2 (e.g., a short message service center (SMSC)) may also forward CDRs. For example, the service provider of the core IP network may also be the same service provider for the access networks. Alternatively, the service providers of the core IP network and the access networks may simply have an agreement to share CDRs between the two service providers.

Although the present disclosure is directed to identifying sources of SMS spam, the collection of CDRs for such purposes is not limited to the collection of CDRs for SMS messages. Rather, the CDRs collected at step 310 include any and all CDRs collected by processing elements in the access networks, core network(s), etc. For example, CDRs collected at step 310 may also include CDRs from voice calls and data calls. Although such CDRs do not directly pertain to SMS messages, information and patterns derived from voice and data usage can be used to further determine the likelihood that a particular device is a source of SMS spam. For instance, a device that is primarily used for voice calls may be less likely to be a source of SMS spam.

In step 320, method 300 extracts various features or parameters from the CDR(s) based on various CDR features/parameters. The terms "CDR features" and "CDR parameters" are used interchangeably in the present disclosure. It should be noted that each CDR comprises numerous fields containing different information or parameters. To name only a few parameters for illustration, CDR parameters may comprise a cause code, a calling party area code, a calling party phone number, a called party area code, a called party phone number, a date of the call, a time stamp for the start of a call, a time stamp for the end of a call, a time duration of a call, a type of call, a direction of a call, a trunk group used by a call, a gateway used by a call, a node traversed by a call, an IP address, an international mobile equipment identify (IMEI) number and/or a mobile equipment identifier (MEID), a type allocation code (TAC) (which may also be contained within the IMEI/MEID), a data volume of a call, and so on. It should be noted the above list is not exhaustive and is not representative of all CDR parameters that are currently provided in a CDR or any CDR parameters to be provided in the future for a CDR.

In step 330, method 300 applies a SMS spam detection engine/algorithm to one or more of the extracted parameters from the CDR(s) for identifying a likely source of SMS spam. Broadly, method 300 may identify a potential source of short message service spam by analyzing the one or more features that are extracted from each of the plurality of call detail records. A more detailed description of an exemplary SMS spam detection engine/algorithm is described in connection with FIG. 4. For example, the SMS spam detection engine may employ a classification model/algorithm, which may comprise a decision tree-based algorithm, where each node in the decision tree is representative of a particular CDR parameter.

At step 340, the method 300 determines whether a potential SMS spam source has been identified. For example, the application of the SMS spam detection algorithm at step 330 may indicate that a device and/or an account is a potential source of SMS spam based upon one or more of the collected CDRs. The device and/or account that is identified as a potential SMS source may be indicated by a number of identifiers, such as a MAC address, an IP address, an IMEI and/or MEID number, an IMSI number, along with a number of secondary features such as a cellular carrier identifier, a geographic location, an indication of whether a device is associated with a prepaid account, an account number, the device type, an indication of whether a device is transmitting messages via the Internet, and the like. In any case, if a potential SMS spam source is identified, the method 300 may proceed to optional step 350. Otherwise, the method proceeds to step 380.

At step 380, the method 300 determines whether to continue collecting additional call detail records. If the method 300 determines to collect and analyze additional call detail records, the method returns to step 310 and continues to operate as described above with respect to one or more subsequent CDRs. Otherwise, the method 300 proceeds to step 395 where the method terminates.

At optional step 350, the method 300 provides the identified potential SMS spam source to other devices and/or fraud analysis personnel. For example, once a potential SMS source is identified at step 340, it may be desirable to confirm the results of the SMS spam detection engine, e.g., in the event there may be false positives that identify legitimate users who are not SMS spammers. For instance, if the results of step 340 are provided to fraud analysis personnel, the fraud analysis personnel may then perform a manual investigation of a particular source, such as by gathering additional data pertaining to a particular device identifier (e.g., a IMSI number, IMEI/MSID, MAC address, IP address, or a particular account number (if the identified potential SMS spam source is associated with an account on the same network in which method 300 is performed), and the like). Manual observation by fraud analysis personnel may reveal further patterns that confirm an indentified potential SMS spam source is in fact a spam originator, or conversely may find that the identified potential SMS spam source is a false positive, and is not in fact a source of SMS spam. For example, the identified potential SMS spam source may be compared to a white list of verified/trusted SMS messages sources (e.g., television programming networks sending a large volume of SMS messages to users who have subscribed to SMS distribution lists and have actively solicited the SMS messages from the sources). In addition device-to-device SMS messaging is increasingly being used (e.g., for remote sensing and other applications) that generates a high volume of SMS messages that may cause such devices to be identified as potential sources of SMS spam. Thus, in one embodiment training data is used to configure the SMS spam detection engine such that legitimate device to device messaging is distinguished from patterns of SMS spam. However, if there are any false positives, this may be confirmed at step 350.

Alternatively, or in addition, the identified potential SMS spam source may be provided to one or more network devices for in-network filtering of SMS spam messages. For example, each of a number of network devices (e.g., routers, switches, network gateway border elements, base station controllers, mobile switching centers, CSCFs, etc.) may maintain blacklists of device identifiers/account identifiers that are blocked or prohibited from sending and receiving messages. Thus, an IMEI or other identifier associated with the identified potential SMS spam source may be added to the blacklist. Any new SMS messages (as well as voice and data messages) from a source associated with the device identifier/account identifier may then be blocked at the first network device that detects a communication from the blocked source. In other words, a watch list of devices and/or accounts used by spammers may be maintained in parallel to the detection algorithm of steps 330-340, to separately and complimentarily filter and block SMS spam messages from known SMS spam sources.

In this regard, it should be noted that a typical cellular account is associated with a SIM card and IMSI number (i.e., a telephone number). However, SIM cards are easily replaced and the same physical device can be reused with a different SIM card, which may be associated with a new and different pre-paid cellular account with a different telephone number. As such, one embodiment of the present disclosure employs a watch list for SMS message blocking that looks to the IMEI/MEID number associated with the device. In contrast to the IMSI number, the IMEI/MEID number is not easily changed and is effectively permanently associated with the device. Thus, even if a spammer substitutes a SIM card into a device when an account associated with the SIM card is blocked, if IMEI/MEID blocking is employed, the spammer's SMS messages will still be blocked. In addition, the account associated with the new SIM card and new IMSI number will also be blocked based upon an association with the IMEI/MEID number that is known to be associated with SMS spam activity.

Following optional step 350, the method 300 may proceed to optional step 360 where it is determined whether there is feedback to provide to the SMS spam detection engine. For example, an investigation by fraud analysis personnel may determine that the SMS spam detection engine has correctly identified a SMS spam source. The personnel may then confirm or otherwise mark the identified potential SMS spam source as a confirmed SMS spam source for feedback at step 360. Subsequently, the method 300 may then provide various points of data relating to the confirmed SMS spam source back to the SMS spam detection engine. In one embodiment, a potential SMS spam source that is confirmed at step 360 is identified in the feedback that is provided using one or more identifiers such as an account number, an IMSI number, an IMEI/MEID number, and the like. In one embodiment, the SMS spam detection engine is able to incorporate this information on the confirmed SMS spam source into a blacklist or other mechanism to screen future calls and messages from such source. For example, in one embodiment a first node of a decision tree implemented by the SMS spam detection engine may comprise a blacklist of banned devices. If a CDR from a subsequent message indicates the message is from a device/account associated with a known SMS spam source, the message may be immediately blocked. For instance, if a SMS spammer is blocked using one account and changes SIM cards to use a new account, the method 300 may still filter SMS messages from this spammer when the spammer reuses the same device having the same IMEI number. In addition, the new account associated with the new SIM card may also be blocked (e.g., by being added to another blacklist). Thus, even if the spammer attempted to reuse the SIM card in a new device having a different IMEI number, the messages would still be blocked because the account associated with the SIM card is also flagged in a blacklist.

In addition, at step 360 the method 300 may also determine that various other operating parameters of the SMS spam detection engine should be updated. For instance, it may be determined at step 350 that a false positive occurred with respect to a legitimate device to device SMS message source. If so, at step 360, the method 300 may provide feedback to cause the SMS spam detection engine to modify its algorithm such that similar patterns in the future are less likely to be categorized as spam and more likely to be identified as legitimate device to device messaging. More generally, a certain CDR parameter that was once a strong indicator of SMS spam activity may no longer be closely associated with such activity. As such, the reliance upon this parameter may begin leading to a number of false positives. For instance, the potential SMS spam source identified at step 340 may have been determined to be a false positive at step 350. As such, feedback may be provided to the SMS spam detection engine which instructs or causes the SMS spam detection engine to be modified or evolved to better detect sources of SMS spam. In particular, the feedback may instruct the SMS spam detection engine to modify a classification model/algorithm which it employs. For instance, a second CDR parameter that was once only weakly correlated to SMS spam activity may now be a strong predictor of likely SMS spam activity. As such, the method 300 may determine that the SMS spam detection engine should utilize the second parameter more prominently and the first feature less prominently. Namely, a neural network can be employed to implement the functions of the SMS spam detection engine, such that the feedback can be used to refine the accuracy of the SMS spam detection engine.

For example, the method 300 may determine that the features should be considered in a different order in a decision tree algorithm (e.g., the respective nodes rearranged), or different weighting should be assigned to the features (e.g., lower and higher weightings respectively). Alternatively, or in addition, the feedback may be provided to one or more other devices (e.g., application server 112 or billing and traffic server 130 in FIG. 1) to cause the method 300 to no longer collect certain CDR data, or begin collecting other CDR data for feature analysis. Thus, embodiments of the present disclosure are capable of adapting to changing spamming behaviors over time, based on the feedbacks. In any case, if there is feedback for the method 300 to provide, the method proceeds to optional step 370. Otherwise, the method proceeds to step 390.

At step 390, the method 300 determines whether to continue collecting additional call detail records. If the method 300 determines to collect and analyze additional call detail records, the method returns to step 310 and continues to operate as described above with respect to one or more subsequent CDRs. Otherwise, the method 300 proceeds to step 395 where the method terminates.

As mentioned above, if the method 300 has feedback to provide, the method proceeds from step 360 to step 370, where the SMS spam detection engine is updated. For instance, the SMS spam detection engine may employ a decision tree based classification model/algorithm where the nodes in the initial layers of the tree correspond to the features most strongly indicative of SMS spam activity (or which require the least effort to collect the necessary CDR data) and wherein nodes in higher layers of the tree correspond to features that are less strongly correlated to SMS spam activity (or which require a greater effort to collect the necessary CDR data). The feedback determined at step 360 may be transmitted to the SMS spam detection engine in the form of instructions to the engine to reconfigure the decision tree algorithm, to change the order and flow of the nodes, to adjust which CDR features are considered first, to adjust a score or weighting of each of the nodes, etc.

For example, a threshold number may be set above which the SMS spam detection engine determines a potential SMS spam source exists. Each node in the decision tree may correspond to a particular CDR feature. When each new CDR is received and features extracted by the method 300, the SMS spam detection engine may begin at a first node of a decision tree and consider a first feature. The SMS spam detection engine may then assign a score based upon the extracted feature and proceed to a next node in the decision tree where a second extracted CDR feature is considered and a second score is assigned. The second score may be added to the first score, creating a composite score. The SMS spam detection algorithm may then proceed to a third node where a third feature is considered, and so forth. If and when the composite score exceeds a SMS spam detection threshold, the engine may stop. Alternatively, the engine may continue to consider one or more additional features. Thus, the engine may enhance a confidence score, for instance, by continuing to evaluate additional CDR features, notwithstanding that the threshold has already been crossed for identifying a potential SMS spam source.

Following step 370, the method 300 returns to step 330 where the updated SMS spam detection engine is applied with respect to one or more features extracted from one or more subsequent CDRs. In other words, method 300 can be implemented to be a continuously running method and proceed to step 395 only for certain events, such as server upgrades, maintenance events, etc.

It should be noted that although not specifically specified, one or more steps or operations of method 300 may include a storing, displaying and/or outputting step as required for a particular application. In other words, any data, records, fields, and/or intermediate results discussed in the method can be stored, displayed and/or outputted to another device as required for a particular application.

Figure 4:
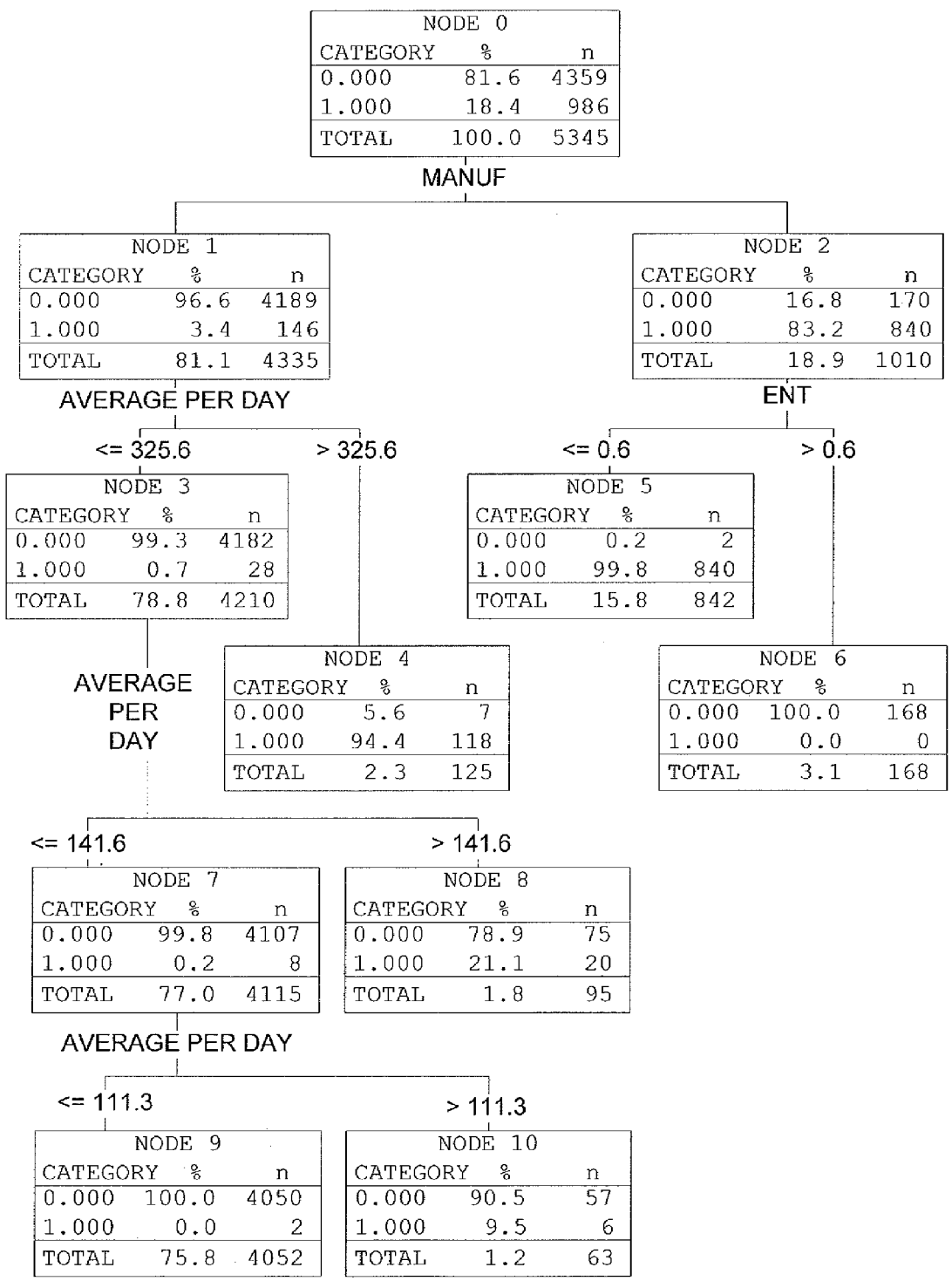
FIG. 4 illustrates an exemplary SMS spam detection method according to embodiments of the present disclosure.

FIG. 4 illustrates an exemplary classification model/algorithm for SMS spam detection. In one embodiment, the algorithm of FIG. 4 comprises a software program stored on a computer-readable medium that is executed by the same device performing steps of the method 300 (e.g., a processor of an application server, such as application server 112 of FIG. 1), or that is executed by another device in communication therewith.

The classification algorithm is illustrated in FIG. 4 as a decision tree based algorithm as just one example. Thus, it should be noted that various other embodiments may employ a classification model/algorithm of a different form. In general, a decision tree is a tree in which each branch node represents a choice between a number of alternatives, and each leaf node represents a classification or decision. In one embodiment, a particular decision tree based algorithm, chi-squared automatic interaction detection (CHAID), is used for detecting potential SMS spam sources. In the context of the present disclosure, each branch node relates to a particular CDR feature that may be used in predicting a potential source of SMS spam. For example, one branch node may pertain to an IMEI/MEID number, another node may pertain to a geographic location, still another node may pertain to a SMS message entropy, and so on.

In CHAID, an independent (predictor) variable is chosen that has the strongest interaction with a dependent variable. Categories of each predictor are merged if they are not significantly different with respect to the dependent variable. In particular, nodes of the decision tree may be merged if the respective CDR features are similarly predictive of the likelihood of a particular source being a SMS spammer. For example, it may be determined that MAC addresses and IP addresses are sufficiently similar features for predicting a potential source of SMS spam. Accordingly, the decision tree nodes pertaining to MAC addresses and IP addresses may be merged, or one of the nodes may be pruned from the decision tree. In any case, a CHAID-based decision tree algorithm is used to identify whether a particular source/device/account is a potential SMS spammer.

As an initial matter, a set of training data from different sources (e.g., SMS spam sources previously identified manually or through other traditional means) is used to generate an initial optimal decision tree that is used determine whether an account that sends a large number of messages is a spammer or not. As described above (e.g., steps 310-320 of FIG. 3) real time CDR input data is processed to extract features. At step 340, these features are run through the SMS spam detection engine to determine, based upon a classification algorithm (e.g., a decision tree as shown in FIG. 4) or a combination of multiple classification algorithms, whether a source is spamming or not.

As shown in FIG. 4, a sample of 5345 accounts was used, of which 18.4% were previously identified as being spam. In this case, an initial split is done based on the manufacturer of the device, e.g., using a type allocation code (TAC) (node 0). For instance, the split may be based upon comparison of the device type extracted from a CDR to a watch list of devices which are known to be favored by spam originators. It can be observed that, for certain manufacturers, the probability of an account being associated with a spammer is very high. After the first sorting, 83.2% of the accounts fall in the category on the right (node 2). A further split is done based on the entropy of the time between consecutive messages for each of the accounts. In particular, the variability in the gap between SMS messages is indicative of spamming activity (e.g., less than or equal to 0.6 or greater than 0.6, as shown in FIG. 4). For instance, when SMS messages are sent in a very uniform and regular pattern, this is indicative of automation in the sending of SMS messages. A legitimate individual user has a much greater variability in the gaps between sending consecutive SMS messages. A final sorting filters out the spam accounts (leaf node 5) or concludes that the source is likely legitimate (leaf node 6). On the other hand, the accounts in node 1 still include 3.4% of spam accounts. These are sorted out with a further split based on the average number of messages sent per day (node 1).

Other nodes (e.g., branch nodes 3 and 7, leaf nodes 4 and 8-10) are shown to illustrate that a classification model/algorithm according to embodiments of the present disclosure may have greater complexity and include various additional nodes corresponding to various other CDR features. Thus, following node 1, a traversal of the decision tree 400 may proceed to node 3 or node 4.

Node 3 for instance may comprise a branch node relating to the average number of voice calls per day and/or an average time duration of each such voice call associated with a particular device/account/source. Notably, the ratio of SMS messages to voice calls/messaging may be indicative of whether or not the source is a potential SMS spammer. In addition, a high number of voice calls of short duration (e.g., less than 30 seconds) may be indicating of spam activity. For instance, a SMS spammer may seek to mask his or her predominant purpose of SMS spam activity with a high volume of voice call activity. However, the fact that the calls are very short duration may imply that there is not a legitimate callee at the other end of each call.

Similarly, node 7 may relate to an average number of incoming SMS messages per day. The average number of incoming SMS messages of node 7, in conjunction with the information on the average number of SMS messages sent per day in node 1 is indicative of whether or not a source is a potential SMS spammer. In particular, a legitimate user/account is more likely to have a response ratio (a ratio of incoming versus outgoing SMS messages) that is close to 1, or where the incoming and outgoing message volume is more or less equal (since he/she is likely to be conversing with other legitimate users who are friends, family, etc.), versus a spammer who sends many more messages than are received.

In one embodiment, node 3 or 7 may further relate to a LACCI (Location Area Code/Cell ID) feature. For instance LACCI fields in CDR may indicate geographic origins and destinations of messages and calls. Notably, the geographic origin of a message associated with a particular call detail record may be indicative of the likelihood that the message is from a SMS spam source (e.g., SMS messages originating from overseas). In addition, a geographic pattern of SMS messaging activity may be indicative of the likelihood that a particular source/account is a SMS spammer. For instance, a SMS spammer may send a large number of SMS messages from one geographic location to a widespread number of recipients in diverse geographic locations and have a very uniform geographic distribution of recipients. On the other hand, a legitimate user may have a very different pattern of sent messages that may appear more narrowly distributed. For instance, a user who lives and works in New York City may previously have lived in Houston and still have many friends and family in that area. A SMS message pattern for the user would probably include a majority of messages to recipients concentrated within the New York City area and the Houston area, with a small number of messages sent to recipients in other areas of the country. Thus, the geographic pattern of a plurality of messages (e.g., derived from a number of LACCI fields of a plurality of CDRs associated with the messages), may be indicative of whether or not a particular source/account is a SMS spammer.

As mentioned above, it should again be noted that not all CDR features have the same cost. For example, some CDR features require hours or days worth of CDR data to have any use in predicting potential SMS spam activity, while others require only minutes worth of CDR data (or even a single CDR). Thus, different classification models/algorithms may be employed with greater or lesser complexity, such that the SMS spam detection engine of step 330 may actually comprise/implement one or more different algorithms, such as shown in FIG. 4, operating simultaneously and/or in conjunction with one another. Thus, one classification model/algorithm may be able to accurately identify a potential source of SMS spam using CDR data that can be collected in a matter of hours, whereas another classification model/algorithm operates using CDR data that takes longer to collect. Similarly, one embodiment may comprise a decision tree based algorithm having a single, large decision tree that analyzes CDR features with both large and small data collection requirement. However, nodes further down or at lower levels of the tree (e.g., nodes 3 and 7 in FIG. 4) may relate to CDR data that takes longer to collect, whereas the nodes in the initial layers (e.g., nodes 0-2) pertain to data that can be more quickly collected and analyzed. Further, where different classification models/algorithms are employed, the results of the different algorithms can be combined such that as more data is collected, a more accurate decision can be made regarding whether a source is a potential SMS spammer. For instance, a threshold score may be set over which a source is considered a potential SMS spammer. Different classification models/algorithms, e.g., of the decision tree or other varieties, may generate different scores which, when combined, may cross the threshold resulting in a potential SMS spam source being identified.

It should be noted that although not specifically specified, the execution of the algorithm or method 400 may include a storing, displaying and/or outputting step as required for a particular application. In other words, any data, records, fields, and/or intermediate results discussed in the algorithm 400 can be stored, displayed and/or outputted, either on the device executing the algorithm 400 or to another device, as required for a particular application.

Furthermore, steps, blocks, or operations in each of FIGS. 3-4 that recite a determining operation or involve a decision do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

Figure 5:
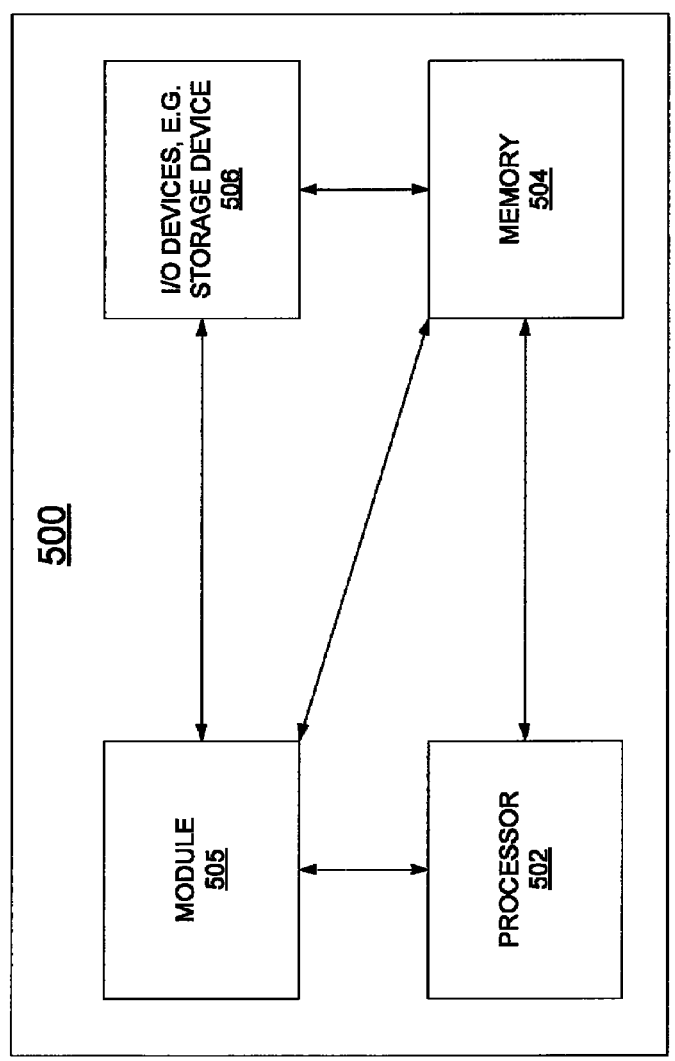
FIG. 5 illustrates a high-level block diagram of a general-purpose computer suitable for use in performing the operations, functions, methods and algorithms described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for identifying a potential SMS spam source, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or system or any other hardware equivalents. In one embodiment, the present module or process 505 for identifying a potential SMS spam source can be implemented as computer-executable instructions (e.g., a software program comprising computer-executable instructions) and loaded into memory 504 and executed by processor 502 to implement the functions as discussed above. As such, the present method 505 for identifying a potential SMS spam source (including associated data structures) of the present disclosure can be stored on a non-transitory computer readable storage medium (e.g., a tangible and physical medium), e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying a potential source of a short message service spam, the method comprising:
   collecting, by a processor, a plurality of call detail records associated with a plurality of short message service messages, wherein a device type allocation code is included in each of the plurality of call detail records;
   extracting, by the processor, the device type allocation code from each of the plurality of call detail records, wherein the device type allocation code identifies a manufacturer of a device that is originating the plurality of short message service messages and a model type of the device;
   comparing, by the processor, the device type allocation code to a device type watch list, wherein the device type watch list includes device type allocation codes of model types that are associated with short message service spam originators;
   identifying, by the processor, the device as the potential source of the short message service spam when the device type allocation code is contained in the device type watch list; and
   blocking, by the processor, communications from an account, the account using the device that has been identified as the potential source of the short message service spam based upon the device type allocation code being contained in the device type watch list, wherein the blocking of the account is based on an entropy of time between consecutive short message service messages associated with the account.

2. The method of claim 1, wherein the device type allocation code is extracted from an international mobile equipment identity number of the device that is included in each of the plurality of call detail records.

3. The method of claim 2, wherein the comparing further comprises comparing the international mobile equipment identity number to a device watch list.

4. The method of claim 1, wherein the blocking further comprises blocking the account using the device that has been identified as the potential source of the short message service spam based upon an international mobile equipment identity number of the device.

5. The method of claim 1, further comprising:
   extracting a geographic origin from each of the plurality of short message service messages, wherein the blocking is further based on the geographic origin being associated with sources of short message service spam.

6. The method of claim 1, wherein the device type allocation code comprises one feature of a plurality of features extracted from each of the plurality of call detail records.

7. The method of claim 6, wherein the plurality of features is used to calculate a response ratio of a number of incoming short message service messages to a number of outgoing short message service messages.

8. The method of claim 6, wherein the plurality of features is used to calculate a ratio of a volume of short message service messages versus a volume of voice calls.

9. The method of claim 6, wherein the plurality of features is used to determine a geographic pattern of a plurality of messages that is sent.

10. The method of claim 9, wherein the geographic pattern comprises a number of geographic destinations of the plurality of messages that is sent, where the number of geographic destinations is determined based upon an area code of each intended recipient of each of the plurality of messages that is sent.

11. The method of claim 1, wherein the collecting the plurality of call detail records is performed by an application server interacting with a billing server.

12. The method of claim 1, wherein the identifying uses a decision tree.

13. The method of claim 1, further comprising:
   providing a feedback comprising an identification of the device that has been identified as the potential source of the short message service spam.

14. A non-transitory computer-readable storage medium storing a plurality of instructions which, when executed by a processor, cause the processor to perform operations for identifying a potential source of a short message service spam, the operations comprising:
   collecting a plurality of call detail records associated with a plurality of short message service messages, wherein a device type allocation code is included in each of the plurality of call detail records;
   extracting the device type allocation code from each of the plurality of call detail records, wherein the device type allocation code identifies a manufacturer of a device that is originating the plurality of short message service messages and a model type of the device;
   comparing the device type allocation code to a device type watch list, wherein the device type watch list includes device type allocation codes of model types that are associated with short message service spam originators;
   identifying the device as the potential source of the short message service spam when the device type allocation code is contained in the device type watch list; and
   blocking communications from an account, the account using the device that has been identified as the potential source of the short message service spam based upon the device type allocation code being contained in the device type watch list, wherein the blocking of the account is based on an entropy of time between consecutive short message service messages associated with the account.

15. The non-transitory computer-readable storage medium of claim 14, the operations further comprising:
   extracting an international mobile equipment identity number of the device from each of the plurality of short message service messages, wherein the blocking is further based on the international mobile equipment identity number.

16. The non-transitory computer-readable storage medium of claim 14, wherein the device type allocation code is extracted from an international mobile equipment identity number of the device that is included in each of the plurality of call detail records.

17. The non-transitory computer-readable storage medium of claim 16, wherein the comparing further comprises comparing the international mobile equipment identity number to a device watch list.

18. An apparatus for identifying a potential source of a short message service spam, the apparatus comprising:
   a processor; and
   a non-transitory computer-readable medium storing instructions which, when executed by the processor, cause the processor to perform operations, the operations comprising:
      collecting a plurality of call detail records associated with a plurality of short message service messages, wherein a device type allocation code is included in each of the plurality of call detail records;

extracting the device type allocation code from each of the plurality of call detail records, wherein the device type allocation code identifies a manufacturer of a device that is originating the plurality of short message service messages and a model type of the device;

comparing the device type allocation code to a device type watch list, wherein the device type watch list includes device type allocation codes of model types that are associated with short message service spam originators;

identifying the device as the potential source of the short message service spam when the device type allocation code is contained in the device type watch list; and blocking communications from an account, the account using the device that has been identified as the potential source of the short message service spam based upon the device type allocation code being contained in the device type watch list, wherein the blocking of the account is based on an entropy of time between consecutive short message service messages associated with the account.

19. The apparatus of claim 18, wherein the device type allocation code is extracted from an international mobile equipment identity number of the device that is included in each of the plurality of call detail records.

20. The apparatus of claim 19, wherein the comparing further comprises comparing the international mobile equipment identity number to a device watch list.

* * * * *